United States Patent
Okada et al.

(10) Patent No.: US 11,927,748 B2
(45) Date of Patent: Mar. 12, 2024

(54) IMAGING DEVICE AND VEHICLE VISUAL-RECOGNITION APPARATUS

(71) Applicant: Panasonic Intellectual Property Management Co., Ltd., Osaka (JP)

(72) Inventors: Shinya Okada, Tokyo To (JP); Katsumi Umeda, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 559 days.

(21) Appl. No.: 17/214,359

(22) Filed: Mar. 26, 2021

(65) Prior Publication Data

US 2021/0302722 A1 Sep. 30, 2021

(30) Foreign Application Priority Data

Mar. 31, 2020 (JP) ................. 2020-064905

(51) Int. Cl.
*G02B 27/00* (2006.01)
*B60R 1/26* (2022.01)
(Continued)

(52) U.S. Cl.
CPC ............ *G02B 27/0006* (2013.01); *B60R 1/26* (2022.01); *B60R 1/27* (2022.01); *B60S 1/026* (2013.01);
(Continued)

(58) Field of Classification Search
CPC ..... G02B 27/0006; G02B 1/118; B60S 1/026; H05B 3/84; H05B 2203/013; B60R 1/00;
(Continued)

(56) References Cited

U.S. PATENT DOCUMENTS

| 7,002,139 | B2 * | 2/2006 | Stallard | ............. H01L 31/02325 |
| | | | | 359/512 |
| 2008/0239519 | A1 * | 10/2008 | Lin | ........................ B82Y 20/00 |
| | | | | 977/750 |

(Continued)

FOREIGN PATENT DOCUMENTS

| JP | 2012-185239 | 9/2012 |
| JP | 2019-168509 A | 10/2019 |

(Continued)

OTHER PUBLICATIONS

Office Action from Japan Patent Office (JPO) in Japanese Patent Appl. No. 2020-064905, dated May 9, 2023, together with an English language translation.

*Primary Examiner* — Ricky D Shafer
(74) *Attorney, Agent, or Firm* — GREENBLUM & BERNSTEIN, P.L.C.

(57) ABSTRACT

An imaging device includes an imaging unit, a lens unit including a plurality of lenses stacked on each other to guide light to the imaging unit, a heater member used for a heater configured to heat a top lens closest to an object among the lenses included in the lens unit, and a reflection suppressor disposed between a region outside of an effective region of the top lens and the heater member, the reflection suppressor being configured to suppress light reflection. The reflection suppressor includes a first reflection suppressor disposed on the top lens side and having an uneven surface, and a second reflection suppressor disposed on the heater member side, the first reflection suppressor being layered on the second reflection suppressor. A surface of the second reflection suppressor facing the heater member is smoother than a surface of the second reflection suppressor facing the first reflection suppressor.

18 Claims, 6 Drawing Sheets

(51) Int. Cl.
*B60R 1/27* (2022.01)
*B60S 1/02* (2006.01)
*G02B 1/118* (2015.01)
*H05B 3/84* (2006.01)

(52) U.S. Cl.
CPC ............... *G02B 1/118* (2013.01); *H05B 3/84* (2013.01); *H05B 2203/013* (2013.01)

(58) Field of Classification Search
CPC .... B60R 1/25; B60R 1/26; B60R 1/27; B60R 2001/1253
USPC ................. 359/512, 599, 601, 611, 614, 819
See application file for complete search history.

(56) References Cited

U.S. PATENT DOCUMENTS

| | | | | |
|---|---|---|---|---|
| 2010/0226016 A1* | 9/2010 | Hirauchi | ................. | G03B 9/02 264/293 |
| 2010/0309553 A1* | 12/2010 | Nagamizu | .......... | G02B 27/0006 359/512 |
| 2012/0162795 A1* | 6/2012 | Yoshimura | ........... | G02B 13/001 359/830 |
| 2012/0170125 A1* | 7/2012 | Han | ....................... | G02B 7/021 359/601 |
| 2013/0003199 A1* | 1/2013 | Jeong | ............... | B29D 11/00375 264/1.7 |
| 2015/0103226 A1* | 4/2015 | Takahashi | .............. | G02B 1/118 348/335 |
| 2015/0244905 A1* | 8/2015 | Morishima | ........... | G02B 7/022 348/148 |
| 2021/0294066 A1 | 9/2021 | Hirata et al. | | |

FOREIGN PATENT DOCUMENTS

| | | |
|---|---|---|
| KR | 10-2018-0060752 | 6/2018 |
| WO | 2018/123546 A1 | 7/2018 |
| WO | 2019/225745 | 11/2019 |

* cited by examiner

FIG.8

IMAGING DEVICE AND VEHICLE VISUAL-RECOGNITION APPARATUS

CROSS-REFERENCE TO RELATED APPLICATIONS

This application is based upon and claims the benefit of priority from Japanese Patent Application No. 2020-064905, filed on Mar. 31, 2020, the entire contents of which are incorporated herein by reference.

FIELD

Embodiments described herein relate generally to an imaging device and a vehicle visual-recognition apparatus.

BACKGROUND

Recently, on-vehicle imaging devices have been widely used instead of vehicle mirrors from a viewpoint of reduction in driving burden on drivers and elimination of blind areas. These on-vehicle imaging devices are additionally provided with functions for removing water drops, ice, and fog on their lenses to secure visibility for drivers.

For example, International Publication WO2018/123546 discloses an on-vehicle imaging device with a heater for removing water drops or the like located near a top lens that is a lens disposed on the outermost surface (closest to an object) inside a lens unit.

The top lens is provided with a reflection suppressor that suppress light reflection as an anti-stray light measure in a region outside of an effective region of the top lens. The reflection suppressor is, for example, black resin containing pigment, dye, or the like to form an uneven surface that facilitates irregular reflection. If, for example, a metal film serving as a heater is attached to the reflection suppressor having the uneven surface, the film resistance of the metal film becomes unstable, and thereby the performance of the heater deteriorates.

SUMMARY

To resolve the aforementioned issues, an imaging device according to an embodiment of the present disclosure includes an imaging unit, a lens unit, a heater member, and a reflection suppressor. The lens unit includes a plurality of lenses stacked on each other and is configured to guide light to the imaging unit. The heater member is used for a heater configured to heat a top lens closest to an object among the lenses included in the lens unit. The reflection suppressor is disposed between a region outside of an effective region of the top lens and the heater member and is configured to suppress light reflection. The reflection suppressor includes a first reflection suppressor disposed on the top lens side and having an uneven surface, and a second reflection suppressor disposed on the heater member side, the first reflection suppressor being layered on the second reflection suppressor. A surface of the second reflection suppressor facing the heater member is smoother than a surface of the second reflection suppressor facing the first reflection suppressor.

DETAILED DESCRIPTION

Exemplary embodiments of an imaging device and a vehicle visual-recognition apparatus according to the present disclosure will be described with reference to the drawings.

First Embodiment

Figure 1:
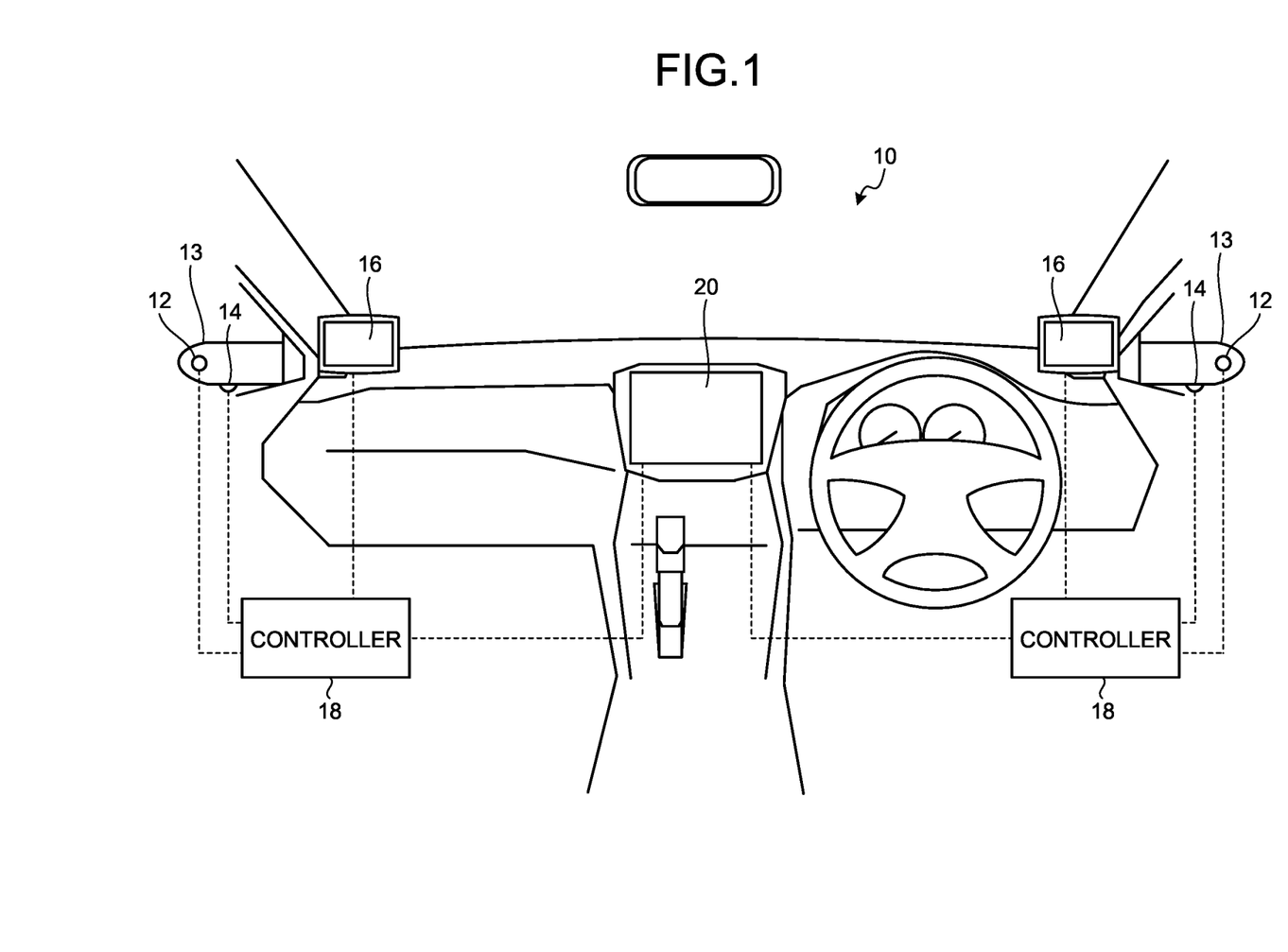
FIG. 1 is a schematic block diagram illustrating an exemplary configuration of a vehicle visual-recognition apparatus that uses an imaging device according to a first embodiment.

FIG. 1 is a schematic block diagram illustrating an exemplary configuration of a vehicle visual-recognition apparatus 10 that uses an imaging device according to a first embodiment. As illustrated in FIG. 1, the vehicle visual-recognition apparatus 10 includes a rear-and-side view camera 12, a surrounding view camera 14, a monitor 16, and a controller 18, for each of the right half and the left half of a vehicle. The vehicle visual-recognition apparatus further includes a central monitor device 20 located at the center of the instrumental panel of the vehicle.

The rear-and-side view cameras 12 are provided on side doors of the vehicle (front side doors not illustrated in the figure) and take images of rear-and-side views of the vehicle. The rear-and-side view cameras 12 are mounted on casings 13 each having a substantially rectangular box shape and serving as a support, and include lenses directed toward the rear and sides of the vehicle in a manner to take images of the rear-and-side views of the vehicle. The casings 13 are supported on the side doors in a manner capable of pivotally moving toward the front and rear of the vehicle.

The surrounding view cameras 14 are mounted on the casings 13 on which the rear-and-side view cameras 12 are mounted, and take images of a surrounding view of the vehicle. In the first embodiment, the surrounding view cameras 14 take images of a front view, a rear view, and side views of the vehicle as an example of a surrounding view of the vehicle.

The monitors 16 are mounted in the vicinity of the lower ends of front pillars, and mainly display images taken by the rear-and-side view cameras 12. In other words, the monitors 16 can serve as outer mirrors, and allow a driver to visually recognize the rear-and-side situation of the vehicle by checking the monitors 16.

The controllers 18 control the components of the vehicle visual-recognition apparatus 10. Specifically, the controllers 18 are provided for the right half and the left half of the vehicle, and control the display of images taken by the rear-and-side view cameras 12 on the right half and the left half. Furthermore, the controllers 18 can, for example, control heaters mounted on the rear-and-side view cameras 12 and the surrounding view cameras 14 so as to remove water drops and the like on their lenses.

The central monitor device 20 can generate bird's-eye view images centered on the vehicle from images taken by the surrounding view cameras 14 to display the same, and display a control panel and the like for allowing a driver to operate on-vehicle devices (such as car navigation system, air conditioner, and audio device).

The rear-and-side view cameras 12 and surrounding view cameras 14 are exemplary "imaging devices", and the monitors 16 and the central monitor device 20 are exemplary "displays."

Figure 2:
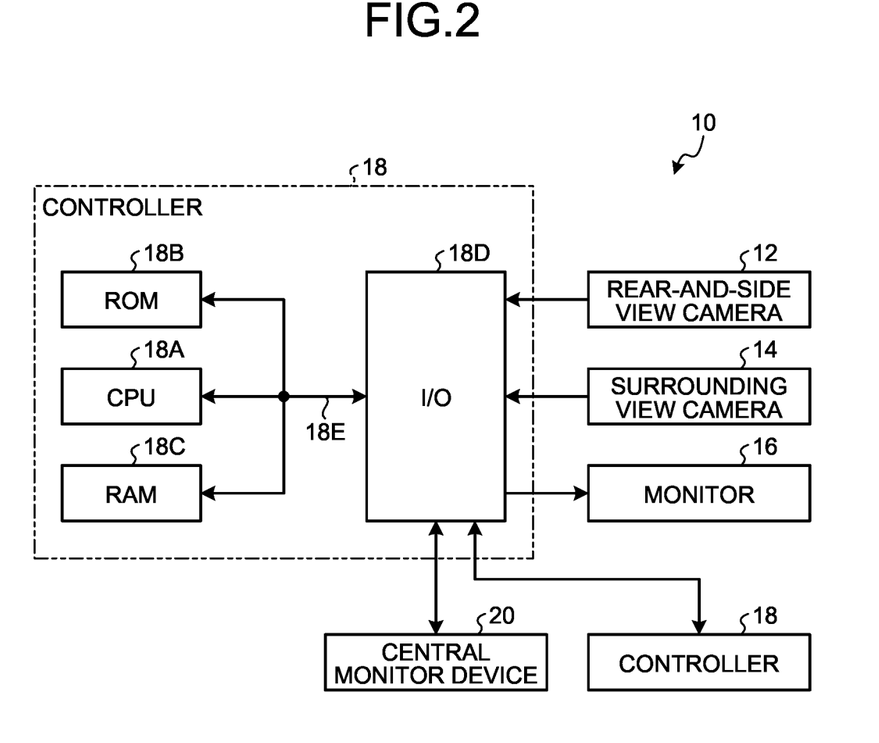
FIG. 2 is a block diagram illustrating an exemplary configuration of a control system of the vehicle visual-recognition apparatus according to the first embodiment.

Next, the following describes a configuration of a control system of the vehicle visual-recognition apparatus 10 according to the first embodiment. FIG. 2 is a block diagram illustrating an exemplary configuration of the control system of the vehicle visual-recognition apparatus 10 according to the first embodiment.

Each of the controllers 18 is configured by a microcomputer provided with a Central Processing Unit (CPU) 18A, a Read Only Memory (ROM) 18B, a Random Access Memory (RAM) 18C, and an Input/output Interface (I/O) 18D each connected to a bus 18E.

The ROM 18B stores a plurality of computer programs that control the display of images taken by the rear-and-side view camera 12 on the monitor 16. The CPU 18A loads the computer programs stored in the ROM 18B on the RAM 18C and executes the computer programs to control the display on the monitor 16.

The I/O 18D is connected to the rear-and-side view camera 12, the surrounding view camera 14, the monitor 16, and the central monitor device 20.

As described above, the rear-and-side view cameras 12 take images of the rear-and-side views of the vehicle to obtain the images. The images taken by each of the rear-and-side view cameras 12 are transferred to the corresponding controller 18.

As described above, the surrounding view cameras 14 take images of a surrounding view of the vehicle to obtain the images. The images taken by each of the surrounding view cameras 14 are transferred to the corresponding controller 18.

The monitors 16 display images taken by the rear-and-side view cameras 12. The central monitor device 20 generates bird's-eye view images from images taken by the surrounding view cameras 14 to display the same. The central monitor device 20, similarly to the controllers 18, is configured by a microcomputer provided with a CPU, a ROM, a RAM, and an I/O each connected to a bus. Furthermore, images displayed on the central monitor device 20 may not be necessarily bird's-eye view images.

In accordance with the first embodiment, since a pair of the controllers 18 is provided in a manner that the controllers 18 are disposed on the right half and the left half of the vehicle, the I/O 18D for one of the controllers 18 is connected to the other controller 18 so that the controllers 18 can communicate with each other. As a modification, only one of the controllers 18 may be mounted to control the rear-and-side view cameras 12 and the monitors 16 on the right half and the left half.

Figure 3:
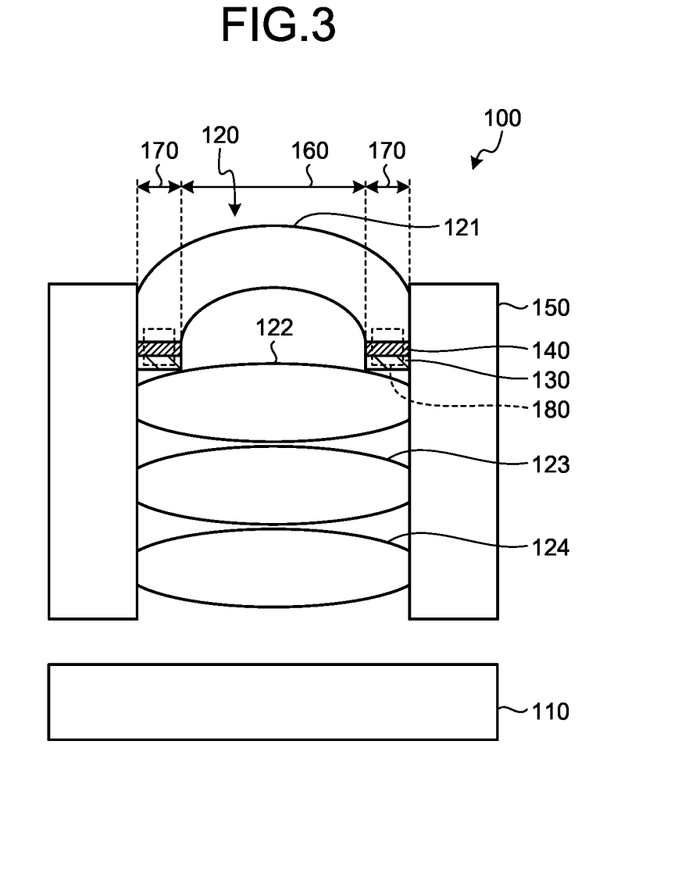
FIG. 3 is a diagram illustrating an exemplary configuration of the imaging device according to the first embodiment.

Next, an imaging device 100 applied to each of the rear-and-side view cameras 12 or each of the surrounding view cameras 14 will be described. FIG. 3 is a diagram illustrating an exemplary configuration of the imaging device 100 according to the first embodiment.

As illustrated in FIG. 3, the imaging device 100 includes an imaging unit 110, a lens unit 120, heater members 130, and a reflection suppressor 140. The lens unit 120, the heater members 130, and the reflection suppressor 140 are contained within a casing 150.

The imaging unit 110 includes a photoelectric conversion element that converts light incident from the lens unit 120 to electric signals, and a processing unit that processes the electric signals converted by the photoelectric conversion element to generate an image. For example, the imaging unit 110 may be a Complementary Metal Oxide Semiconductor (C-MOS) sensor or a Charge Coupled Device (CCD).

The lens unit 120 includes a plurality of lenses, in particular, a lens 121, a lens 122, a lens 123, and a lens 124 that are configured to guide light to the imaging unit 110. In this example, the lens unit 120 includes four lenses, however, any number of lenses may be used as necessary depending on design conditions and the like.

The heater members 130 are used for heaters that heat the lens 121 (hereinafter referred to as the "top lens 121") closest to the object side among the lenses (the lens 121, the lens 122, the lens 123, and the lens 124) included in the lens unit 120. In this example, the heater members 130 are metal films configured to generate heat when receiving power (in other words, the heater members 130 serve as heaters). For example, the controllers 18 can cause an unillustrated electrical power source to supply electric power through electrical wirings to the heater members 130 so that the heater members 130 can generate heat. The controllers 18 may not be the only devices that cause the heater members 130 to generate heat. Any device other than the controllers 18 may cause the heater members 130 to generate heat.

The reflection suppressor 140 is disposed between a region 170 outside of an effective region 160 of the top lens 121 and the heater members 130, and is configured to suppress light reflection. The reflection suppressor 140, for example, is black resin or the like, and is provided to suppress adverse influences of ghosting flare due to multiply reflected light between reflection surfaces.

Figure 4:
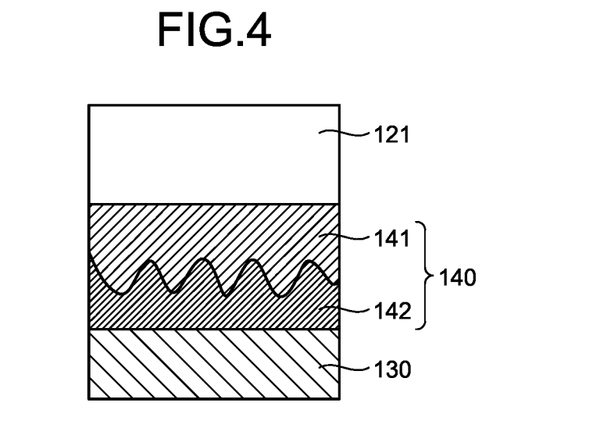
FIG. 4 is a magnified view of a reflection suppressor according to the first embodiment.

FIG. 4 is a magnified view of a region 180 illustrated in FIG. 3. As illustrated in FIG. 4, the reflection suppressor 140 includes a first reflection suppressor 141 disposed on the top lens 121 side and having an uneven surface, and a second reflection suppressor 142 disposed on the heater members 130 side, the first reflection suppressor 141 being layered on the second reflection suppressor 142. A surface of the second reflection suppressor 142 facing the heater members 130 is smoother than a surface of the second reflection suppressor 142 facing the first reflection suppressor 141.

The first reflection suppressor 141 contains pigment or dye (for example, talc and the like) that facilitates irregular reflection. Pigment or dye contained in the first reflection suppressor 141 forms an uneven surface. The second reflection suppressor 142 contains less pigment or dye than that of the first reflection suppressor 141. In this example, the second reflection suppressor 142 does not contain pigment or dye. However, the second reflection suppressor 142, for example, may contain pigment or dye to the extent that film resistance described hereafter does not become unstable. In short, the second reflection suppressor 142 is only required to contain less pigment or dye than that of the first reflection suppressor 141. In other words, the surface of the second reflection suppressor 142 facing the heater members 130 may be smooth or nearly smooth to the extent that film resistance described hereafter does not become unstable.

In the first embodiment, the first reflection suppressor 141 disposed on the top lens 121 side and having an uneven surface is layered on the second reflection suppressor 142 disposed on the heater members 130 side. The surface of the second reflection suppressor 142 facing the heater members 130 is smoother than the surface of the second reflection suppressor 142 facing the first reflection suppressor 141. Accordingly, as film resistance will not become unstable, heating performance for removing water drops and the like on the lenses will not deteriorate.

Figure 5:
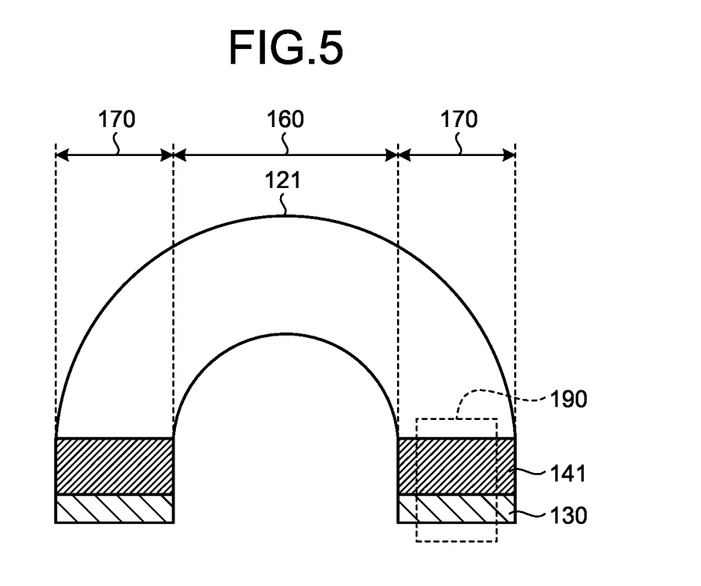
FIG. 5 is a diagram illustrating an exemplary configuration of the imaging device according to a comparative example.
Figure 6:
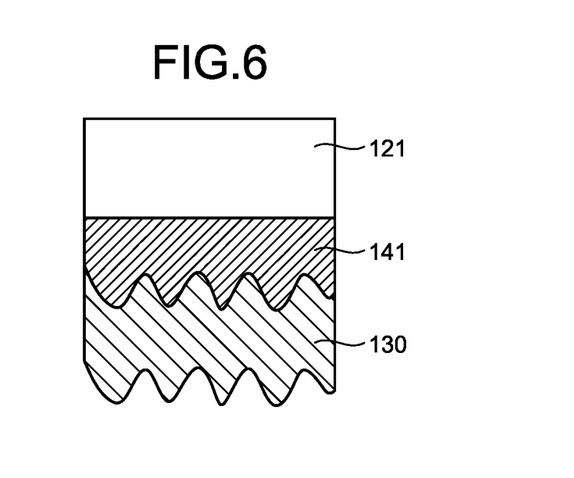
FIG. 6 is a magnified view of the reflection suppressor of the comparative example.

FIG. 5 is a diagram illustrating a comparative example wherein the first reflection suppressor 141 is disposed between the top lens 121 and the heater members 130 without the second reflection suppressor 142. FIG. 6 is a magnified view of a region 190 illustrated in FIG. 5. As already described above, the first reflection suppressor 141 has an uneven surface. Accordingly, if metal films that are the heater members 130 are formed on the uneven surface, the metal films do not stably adhere to the uneven surface, and thereby the film resistance of the metal films become unstable. Such unstable film resistance deteriorates the heating performance.

On the other hand, in the first embodiment, the reflection suppressor 140 includes the first reflection suppressor 141 disposed on the top lens 121 side and having an uneven surface, and the second reflection suppressor 142 disposed on the heater members 130 side, and the first reflection suppressor 141 is layered on the second reflection suppressor 142. As the surface of the second reflection suppressor 142 facing the heater members 130 is smooth, if metal films that are the heater members 130 are formed on the smooth surface, the metal films can stably adhere to the smooth surface, and thereby the film resistance of the metal film will not become unstable. Consequently, the reflection suppressor 140 having a two-layer structure in accordance with the first embodiment can prevent the deterioration of heating performance while suppressing adverse influences of ghosting flare.

Second Embodiment

Figure 7:
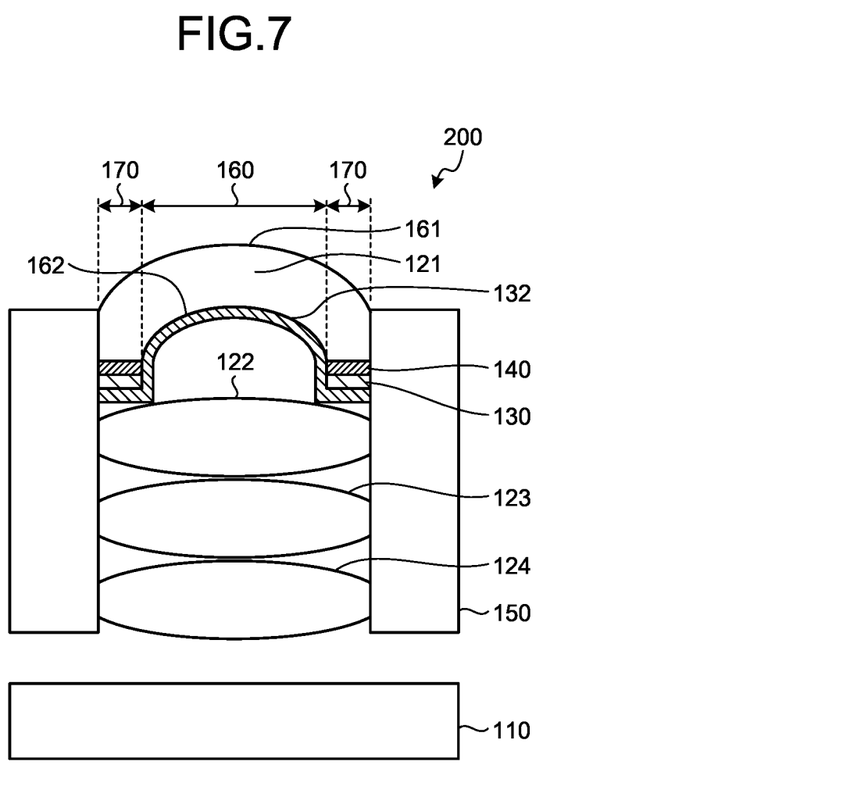
FIG. 7 is a diagram illustrating an exemplary configuration of an imaging device according to a second embodiment.

Next, a second embodiment will be described herein. Any descriptions of the second embodiment common to those of the first embodiment will be omitted as appropriate. The second embodiment is different from the first embodiment in that a transparent electrode configured to generate heat when receiving power is disposed on the rear surface that is opposite to the front surface, the front surface being a surface of the top lens 121 within an effective region 160 close to the object, and the heater members 130 are metal films connecting the transparent electrode to electrical wirings through which electric power is fed. Details will be described hereafter.

FIG. 7 is a diagram illustrating an exemplary configuration of an imaging device 200 according to the second embodiment. As illustrated in FIG. 7, a transparent electrode 132 configured to generate heat when receiving power is disposed on a rear surface 162 that is opposite to a front surface 161 of the top lens 121 on the object side within the effective region 160 of the top lens 121. The transparent electrode 132, for example, is an Indium Tin Oxide (ITO) film.

Figure 8:
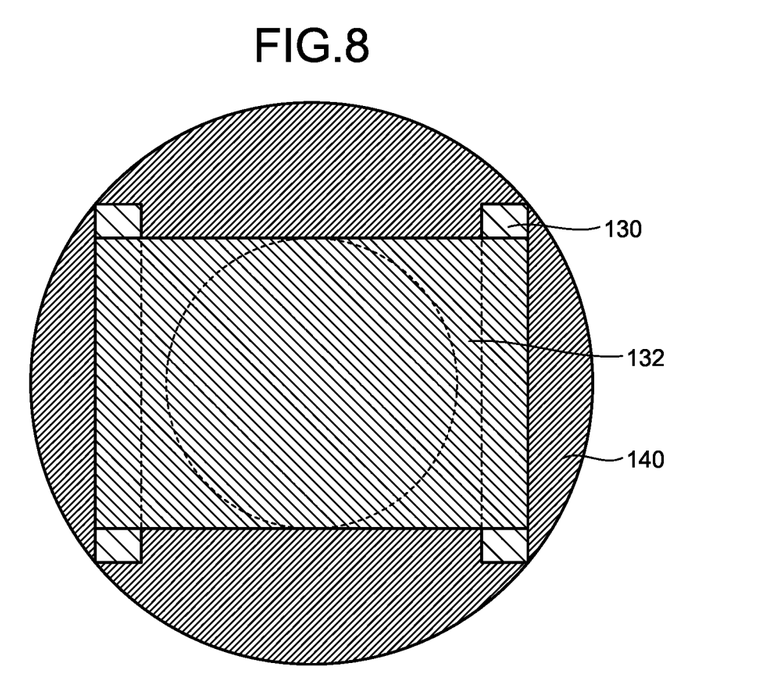
FIG. 8 is a plan view viewed from the rear surface of a top lens according to the second embodiment.

In the second embodiment, the heater members 130 are metal films connecting the transparent electrode 132 to unillustrated electrical wirings through which electric power is fed. As illustrated in FIG. 7, the heater members 130 are disposed in the regions on the transparent electrode 132 corresponding to the region 170 outside of the effective region 160 of the top lens 121. In this example, as the heater members 130 do not serve as heaters, resistance values of the heater members 130 are smaller than those of the heater members 130 described in the first embodiment. For example, the above described controllers 18 each can cause an unillustrated electrical power source to supply electric power through electrical wirings connected to the heater members 130 so that the transparent electrode 132 connected to the heater members 130 can generate heat. Similar to the first embodiment, the reflection suppressor 140 is disposed between the region 170 outside of the effective region 160 of the top lens 121 and the heater members 130. FIG. 8 is a plan view viewed from the rear surface of the top lens 121. As illustrated in FIG. 8, each end of the heater members 130 is disposed to be connectable to an external electrical wiring.

The second embodiment can achieve the same effects as the first embodiment. Furthermore, as the transparent electrode 132 configured to generate heat when receiving power is disposed on the rear surface 162 of the top lens 121 within the effective region 160 thereof, the effective region 160 of the top lens 121 can be directly heated, thereby advantageously improving the heating performance.

The imaging device 100 and the imaging device 200 are applied to the rear-and-side view cameras 12 and surrounding view cameras 14, but not limited thereto. For example, the imaging device 100 and the imaging device 200 can be applied to any cameras, such as a camera that takes images of an interior view, a camera that takes images of a front view, and a camera that takes images of a rear view of a vehicle. In other words, the imaging device 100 and the imaging device 200 can be applied to any vehicle visual-recognition apparatuses in any configurations. For example, the imaging device 100 and the imaging device 200 may be applied to a system serving as a rear view mirror that displays images taken by a camera for taking images of an interior view of a vehicle, a front sensing system that controls the accelerator, brake, or steering wheel of a vehicle by sensing a white line or an obstacle based on images taken by a camera for taking images of a front view of the vehicle while traveling, or a rear view monitor system that allows a driver while driving a vehicle in reverse to check the existence of an obstacle based on images taken by a camera for taking images of a rear view of the vehicle.

Effects to be obtained through each of the embodiments described herein are only exemplified without limitation thereto, and may include other effects.

An imaging device according to one aspect of the present disclosure includes:
  an imaging unit;
  a lens unit including a plurality of lenses stacked on each other and configured to guide light to the imaging unit;
  a heater member used for a heater configured to heat a top lens closest to an object among the lenses included in the lens unit; and
  a reflection suppressor disposed between a region outside of an effective region of the top lens and the heater member, the reflection suppressor being configured to suppress light reflection, wherein
  the reflection suppressor includes a first reflection suppressor disposed on the top lens side and having an uneven surface, and a second reflection suppressor disposed on the heater member side, the first reflection suppressor being layered on the second reflection suppressor, and a surface of the second reflection suppressor facing the heater member is smoother than a surface of the second reflection suppressor facing the first reflection suppressor.

In the imaging device according to one aspect of the present disclosure, for example, the heater member is a metal film configured to generate heat when receiving power.

In the imaging device according to one aspect of the present disclosure, for example, the imaging device includes a transparent electrode disposed on a rear surface that is opposite to a front surface, the front surface being a surface of the top lens within the effective region close to the object, the transparent electrode being configured to generate heat when receiving power, and the heater member is a metal film connecting the transparent electrode to an electrical wiring through which electric power is fed.

In the imaging device according to one aspect of the present disclosure, for example, the first reflection suppressor contains pigment or dye, and the second reflection suppressor contains less pigment or dye than that of the first reflection suppressor.

In the imaging device according to one aspect of the present disclosure, for example, the second reflection suppressor does not contain pigment or dye.

A vehicle visual-recognition apparatus according to one aspect of the present disclosure includes:

the imaging device mentioned above; and a display configured to display an image taken by the imaging device.

The present disclosure provides an imaging device and a vehicle visual-recognition apparatus, which prevent the deterioration of heating performance for removing water drops or the like on a lens. The effect described herein is not necessarily limited thereto, and the imaging device and the vehicle visual-recognition apparatus can have any effect described in the description of the present application.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention. Any elements in different embodiments and modifications may be combined as required.

What is claimed is:

1. An imaging device comprising:
an imaging unit;
a lens unit including a plurality of lenses stacked on each other and configured to guide light to the imaging unit;
a heater member used for a heater configured to heat a top lens closest to an object among the lenses included in the lens unit; and
a reflection suppressor disposed between a region outside of an effective region of the top lens and the heater member, the reflection suppressor being configured to suppress light reflection, wherein
the reflection suppressor includes a first reflection suppressor disposed on the top lens side and having an uneven surface, and a second reflection suppressor disposed on the heater member side, the first reflection suppressor being layered on the second reflection suppressor, and
a surface of the second reflection suppressor facing the heater member is smoother than a surface of the second reflection suppressor facing the first reflection suppressor.

2. The imaging device according to claim 1, wherein the heater member is a metal film configured to generate heat when receiving power.

3. The imaging device according to claim 2, wherein
the first reflection suppressor contains pigment or dye, and
the second reflection suppressor contains less pigment or dye than that of the first reflection suppressor.

4. The imaging device according to claim 3, wherein the second reflection suppressor does not contain pigment or dye.

5. The imaging device according to claim 1, further comprising:
a transparent electrode disposed on a rear surface that is opposite to a front surface, the front surface being a surface of the top lens within the effective region close to the object, the transparent electrode being configured to generate heat when receiving power, wherein
the heater member is a metal film connecting the transparent electrode to an electrical wiring through which electric power is fed.

6. The imaging device according to claim 3, wherein
the first reflection suppressor contains pigment or dye, and
the second reflection suppressor contains less pigment or dye than that of the first reflection suppressor.

7. The imaging device according to claim 6, wherein the second reflection suppressor does not contain pigment or dye.

8. The imaging device according to claim 1, wherein
the first reflection suppressor contains pigment or dye, and
the second reflection suppressor contains less pigment or dye than that of the first reflection suppressor.

9. The imaging device according to claim 8, wherein the second reflection suppressor does not contain pigment or dye.

10. A vehicle visual-recognition apparatus comprising:
an imaging device; and
a display configured to display an image taken by the imaging device,
the imaging device comprising:
an imaging unit;
a lens unit including a plurality of lenses stacked on each other and configured to guide light to the imaging unit;
a heater member used for a heater configured to heat a top lens closest to an object among the lenses included in the lens unit; and
a reflection suppressor disposed between a region outside of an effective region of the top lens and the heater member to suppress light reflection, wherein
the reflection suppressor includes a first reflection suppressor disposed on the top lens side and having an uneven surface, and a second reflection suppressor disposed on the heater member side, the first reflection suppressor being layered on the second reflection suppressor, and a surface of the second reflection suppressor facing the heater member is smoother than a surface of the second reflection suppressor facing the first reflection suppressor.

11. The vehicle visual-recognition apparatus according to claim 10, wherein the heater member is a metal film configured to generate heat when receiving power.

12. The vehicle visual-recognition apparatus according to claim 11, wherein
the first reflection suppressor contains pigment or dye, and
the second reflection suppressor contains less pigment or dye than that of the first reflection suppressor.

13. The vehicle visual-recognition apparatus according to claim 12, wherein the second reflection suppressor does not contain pigment or dye.

14. The vehicle visual-recognition apparatus according to claim 10, further comprising:
a transparent electrode disposed on a rear surface that is opposite to a front surface of the top lens on the object side within the effective region of the top lens, the transparent electrode being configured to generate heat when receiving power, wherein
the heater member is a metal film connecting the transparent electrode to an electrical wiring through which electric power is fed.

15. The vehicle visual-recognition apparatus according to claim 14, wherein
the first reflection suppressor contains pigment or dye, and
the second reflection suppressor contains less pigment or dye than that of the first reflection suppressor.

16. The vehicle visual-recognition apparatus according to claim 15, wherein the second reflection suppressor does not contain pigment or dye.

17. The vehicle visual-recognition apparatus according to claim 10, wherein
the first reflection suppressor contains pigment or dye, and
the second reflection suppressor contains less pigment or dye than that of the first reflection suppressor.

18. The vehicle visual-recognition apparatus according to claim 17, wherein the second reflection suppressor does not contain pigment or dye.

* * * * *